April 20, 1965     A. H. NOTHNAGEL     3,178,871
APPARATUS FOR SEPARATING THISTLES AND THE LIKE FROM PEA VINES
Filed May 22, 1963     2 Sheets-Sheet 1
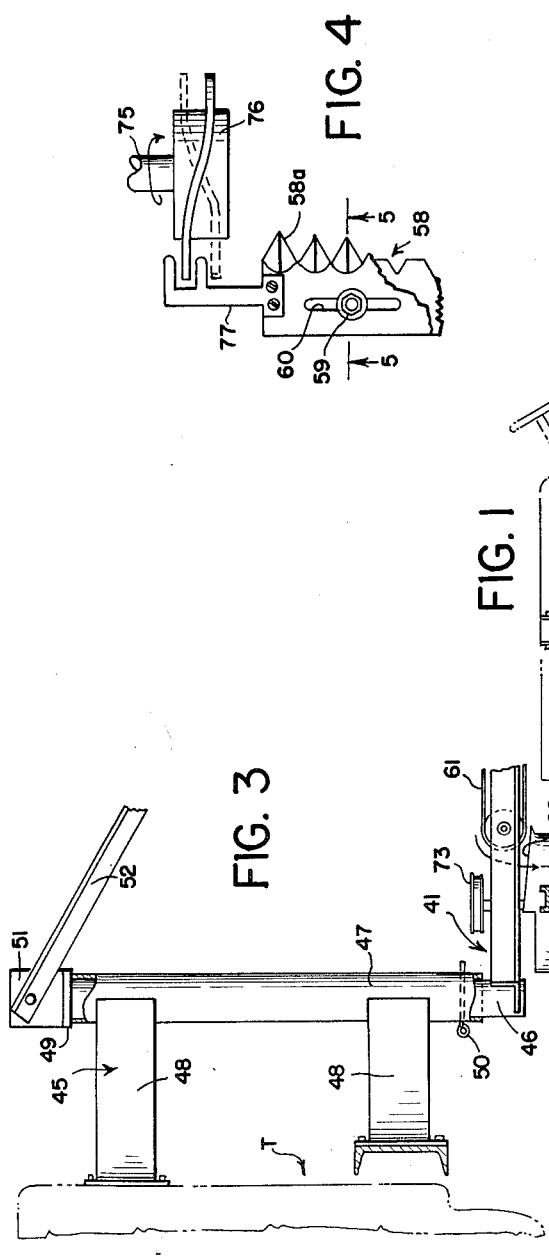
INVENTOR.
ANDREW H. NOTHNAGEL
BY
Williamson & Palmatier
ATTORNEYS April 20, 1965  A. H. NOTHNAGEL  3,178,871
APPARATUS FOR SEPARATING THISTLES AND THE LIKE FROM PEA VINES
Filed May 22, 1963  2 Sheets-Sheet 2
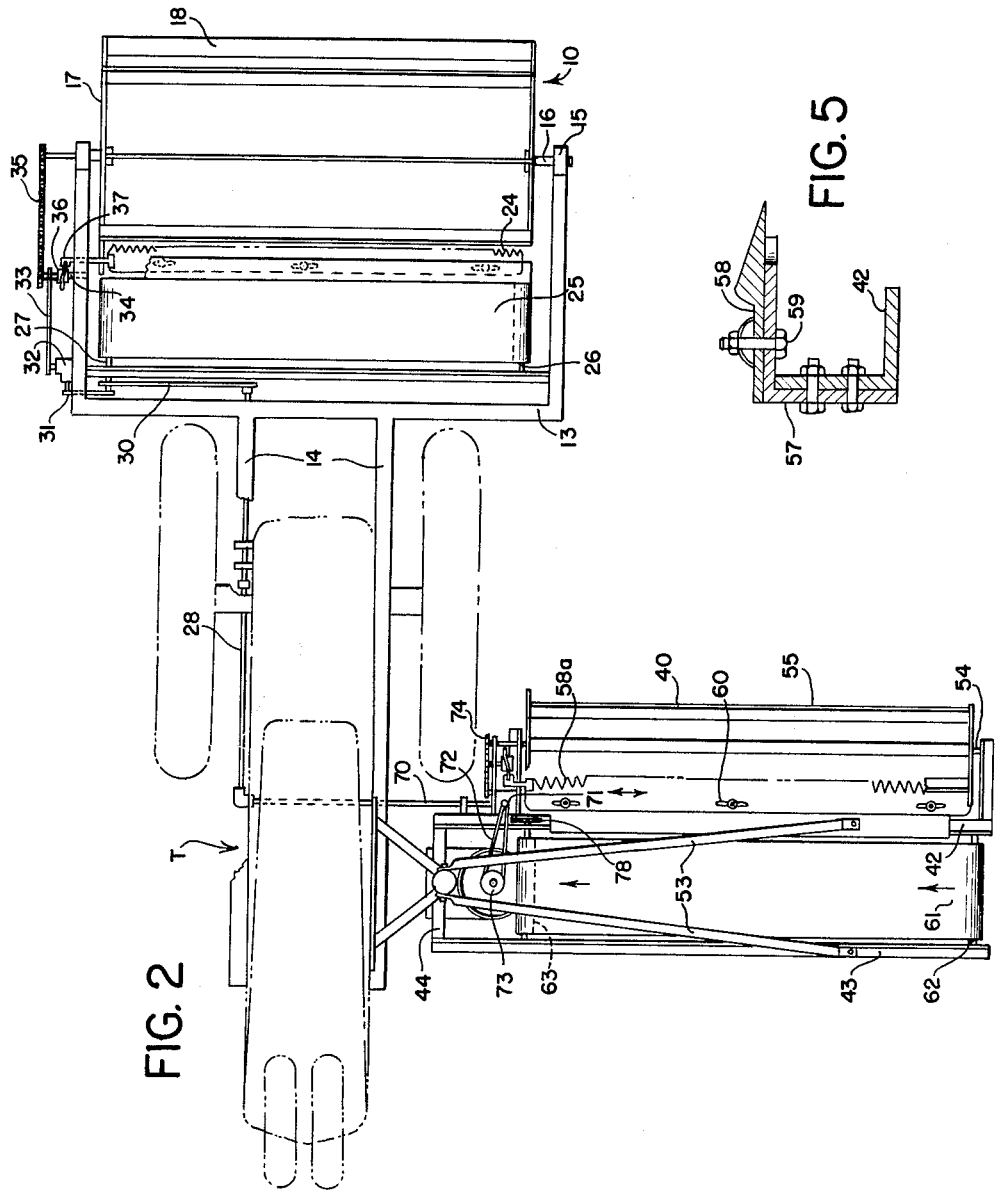
INVENTOR.
ANDREW H. NOTHNAGEL
BY
*Williamson & Palmatier*
ATTORNEYS 3,178,871
APPARATUS FOR SEPARATING THISTLES AND
THE LIKE FROM PEA VINES
Andrew H. Nothnagel, Rte. 3, Litchfield, Minn.
Filed May 22, 1963, Ser. No. 282,480
4 Claims. (Cl. 56—23)

This invention relates to harvesting apparatus and more specifically to apparatus for use in cutting and separating thistles and the like from pea vines during a pea harvesting operation.

When a crop of peas or the like is harvested through the use of conventional harvesting apparatus, a substantial number of thistles or other types of weeds are included with the harvested peas which are cut when they are green. These weeds such as thistles project above the pea vines and have a hard nut-like fruit disposed adjacent the blossom at the top of the plant. The combining operation is not effective to remove the thistles from the peas and it therefore becomes necessary to remove the extraneous thistle nuts in a time consuming manual process during a factory or plant operation.

It is therefore a general object of this invention to provide apparatus, of simple and inexpensive construction and operation, mountable on conventional tractors and which is operable for use in cutting and separating thistles and the like from pea vines during a pea harvesting operation.

Another object of this invention is to provide a tractor mounted harvesting apparatus for use in cutting and separating thistles and the like from pea vines during a harvesting operation and including a crop cutting and conveying device positioned closely adjacent the surface of the ground for cutting crops such as peas and the like, and a thistle cutting device mounted above the crop cutting device and at a level to cut the thistle fruit of mature thistles and the like and to thereafter mulch the thistle nuts prior to discharge thereof.

A further object of this invention is to provide a thistle cutting and mulching device for use in conjunction with a conventional pea harvesting apparatus, and including a cutting mechanism positioned substantially above the pea crop to be harvested and at a level to cut the thistle fruit of mature thistles and the like, and having mulching means for effectively mulching the thistle nuts and thereafter discharging the same between adjacent the windrowed pea crops.

These and other objects and advantages of the invention will more fully appear from the following description made in connection with the accompanying drawings wherein like character references refer to the same or similar parts throughout the several views, and in which:

FIG. 1 is a side elevational view of the invention shown in mounted relation on a conventional tractor, the latter being illustrated by dotted line configuration;

FIG. 2 is a top plan view of the invention;

FIG. 3 is a detailed fragmentary elevational view on an enlarged scale illustrating the manner of attachment of the thistle cutting and mulching device on a tractor;

FIG. 4 is a fragmentary top plan view illustrating the drive transmitting means for the sickle bar of the thistle cutting and mulching device; and FIG. 5 is a cross sectional view taken approximately along line 5—5 of FIG. 4 and looking in the direction of the arrows.

Referring now to the drawing and more specifically to FIGS. 1 and 2, it will be seen that a harvesting device designated generally by the reference numeral 10, for use in cutting, conveying and discharging a crop in windrows, is there shown. This particular harvesting device 10 is illustrated mounted rearwardly of a conventional tractor T, the harvesting device 10 being of the type normally used in the harvesting of crops growing closely adjacent the ground such as peas and the like. Although the harvesting device 10 is mounted rearwardly of the tractor T, it is pointed out that the tractor will travel rearwardly during the pea harvesting operation so that the harvesting device 10 is disposed in a forward position. The pea harvesting device 10 includes a supporting frame 11 comprised of a pair of side frame elements 12 interconnected rigidly at their respective rear ends by a transverse frame element 13. The transverse frame element 13 is connected to the tractor in a conventional manner by suitable hitch arms 14 as best seen in FIG. 2.

The forwardmost ends of the side frame elements 12 are provided with bearing elements 15 for revolvably supporting the respective ends of an elongate shaft 16 of a conventional rotary gathering reel 17. The rotary gathering reel 17, as best seen in FIGS. 1 and 2, is provided with the conventional transversely extending elements 18 which are connected to suitable spiders or spokes for rotation about a transverse horizontally disposed axis, the under passing arc of which is disposed closely adjacent the ground.

The supporting frame 11 is also provided with a pair of generally vertical front frame elements 19 rigidly affixed to the side frame elements 12 and depending therefrom. A pair of rear vertical frame elements 20 are also rigidly affixed to the side frame elements 12 and depend therefrom and are spaced rearwardly of the front frame elements 19. The front frame elements are interconnected by a cross frame element 21 to which is rigidly secured a sickle bar mounting element 22. This sickle bar mounting element 22 has a conventional longitudinally reciprocating sickle bar 23 shiftably mounted thereon and it will be noted that the sickle bar 23 has a serrated front cutting edge 24 as best seen in FIG. 2. The sickle bar 23 is provided with slots, as best seen in FIG. 2, to permit longitudinal movement thereof relative to the mounting bar 22 and the sickle bar cooperates with the cutting reel to define a cutting mechanism adapted to cut crops at a level disposed only slightly above the surface of the ground. Thus during the harvesting operation, the cutting mechanism will cut the pea vines and will impel these vines rearwardly upon conveyor means, the vines being laterally discharged into windrows for the subsequent pickup by a harvesting combine.

The conveyor means used to convey the cut pea vines comprises an elongate generally horizontally oriented endless conveyor apron 25 trained around an idler roller 26 and a driven roller 27, these rollers being journaled for rotation in the front and rear frame elements 19 and 20. Through use of the conveyor mechanism, the cut pea vines will be discharged laterally of the tractor in windrows and the distance between the respective windrows will be determined by the swath cut by the harvesting device 10.

Drive means are provided for imparting rotary movement to the reel 17, reciprocating movement to the sickle bar 23 and rectilinear movement to the conveyor apron 25. To this end it will be seen that the tractor is provided with an elongate drive shaft 28 arranged longitudinally at one side of the tractor and journaled in suitable bearings 29. The end of the drive shaft 28 is drivingly connected by a chain sprocket drive 30 to the driven roller 27 of the conveyor apron 25. Another chain sprocket drive 31 also drivingly interconnects the driven roller 27 to the input shaft of the gear box 32. The output shaft of the gear box 32 is connected through a chain sprocket drive 33 to a small shaft 34 carried by the supporting frame 11 adjacent one end of the reciprocating bar 23.

A chain sprocket drive 35 drivingly interconnects the shaft 34 with the rotary reel shaft 16 for supplying drive to the rotary reel 17. The small shaft 34 has a rotary crank 36 affixed thereto for rotation therewith and this rotary crank engages a notched crank-engaging element 37 affixed to the sickle bar 23. Thus it will be seen that the rotary motion of the shaft 34 is transformed into rectilinear motion through the crank element 36 and this rectilinear motion is transmitted to the sickle bar through the crank engaging element 37.

As pointed out above, when the crop, such as peas, is harvested, the peas will be harvested green and there will always be a substantial number of thistles and other types of weeds which grow high and have their respective heads disposed substantially above the elevation of the pea vines. It is therefore desirable to separate the hard nut-like fruit of the thistles from the pea vines before the windrowed pea vines are picked up by the harvesting combine for separation of the peas. It has been found that if the hard nut-like fruit of the thistles are interminged with the cut windrowed pea vines, the subsequent combining does not effectively separate the thistle fruit from the peas and this requires additional separation steps at the factory or plant where the peas are processed.

Means are therefore provided for cutting the fruit of the tall weeds such as thistles simultaneously during the crop cutting operation and to this end, a thistle cutting and mulching device is mounted at one side of the tractor T rearwardly and laterally of the crop cutting device 10. This thistle cutting and mulching device 40 includes a supporting frame 41 disposed in horizontal relation with respect to the surface of the ground and comprised of an elongate front frame element 42 and a similar elongate rear frame element 43 disposed in substantially parallel relation and interconnected at their respective innermost ends by a fore and aft extending transverse frame element 44. This supporting frame 41 is swingably mounted to the side of the tractor by a mounting structure designated generally by the reference numeral 45 and including an inner mounting post 46 rigidly affixed to the median portion of the transverse frame element 44 and projecting upwardly therefrom. This post 46 is of substantially circular cross sectional configuration and is revolvably positioned within an outer mounting post 47, the latter having upper and lower pairs of attachment brackets 48 affixed thereto and being detachably connected to the tractor body. The outer mounting post 47 is also of circular cross sectional configuration to permit revolving movement of the inner support post 46 relative thereto.

In order to retain the inner post in mounted relation within the outer post, the outer post 46 has a substantially flat retaining plate 49 welded to the upper end thereof and which is positioned in bearing engagement with the upper end of the outer post 47. The inner and outer posts 46 and 47 are apertured at their respective lower ends and a locking pin 50 is extensible therethrough to permit locking of the frame 41 in an operative position. To this end it is pointed out that the thistle cutting and mulching device 40 is swingable from the operative position as illustrated in FIG. 2 to an inoperative position about the vertical axis defined by the axis of the mounting posts 46 and 47. When swung to the inoperative position, the thistle cutting and mulching device 40 will be swung in a rearward direction with respect to the direction of travel but towards the front of the tractor to lie alongside the tractor for transport of the latter along the highway or the like.

The retaining plate 49 has an attachment bracket 51 secured thereto and projecting upwardly therefrom. The respective ends of a pair of elongate generally diverging brace members 52 are connected to the bracket 51 and the outermost ends of these brace members are secured to the front and rear frame elements 42 and 43 respectively. Thus it will be seen that the supporting frame 41 is mounted in a horizontal position rearwardly of the crop cutting device 10.

The front frame element 42 has a pair of laterally spaced-apart reel supporting frame elements 53 rigidly secured to opposite ends thereof and projecting upwardly and forwardly with respect thereto. The respective ends of the rotary reel shaft 54 of the rotary reel 55 are journaled for rotation in the frame elements 53 as best seen in FIG. 2. The rotary reel 55 is also of conventional construction and is provided with a plurality of circumferentially spaced elongate axially extending elements 56 having their respective ends affixed to the shaft by suitable spokes in a conventional manner. It will be noted that in the embodiment shown, the rotary reel 55 is of a size substantially smaller than the size of the reel 17 and that the reel 55 has its under passing arc positioned substantially above the pea vines to be cultivated.

Referring now to FIGS. 1 and 5, it will be seen that front frame element 42 of the supporting frame 41 has an angular sickle bar mounting element 57 rigidly secured thereto and this mounting element has a sickle bar 58 secured thereto by conventional bolt asemblies 59. The sickle bar is provided with slots 60 through which the bolt assemblies 59 project thereby permitting limited longitudinal reciprocal movement of the sickle bar with respect to the mounting element 57. The sickle bar 58 is of conventional construction and is provided with a conventional serrated edge 58a as best seen in FIG. 2. The sickle bar 58 which is oriented in generally horizontal relation with respect to the ground surface is disposed in close proximity to the orbit of rotation of the reel 55 and cooperates therewith to define a cutting mechanism disposed at a level to cut the tops of mature thistles whereby the hard nut-like thistle fruit will be cut and impelled rearwardly upon a conveyor mechanism.

This conveyor mechanism includes an elongate endless apron or belt type conveyor 61 trained around an idler roller 62 and a driven roller 63, these rollers extending between and being journaled for rotation in the frame elements 42 and 43, respectively. It will be noted that the conveyor belt 61 is positioned rearwardly of the cutter mechanism and is operable to convey the cut thistle fruit in an inward direction towards the tractor.

Means are provided for mulching the cut thistle fruit prior to discharge upon the surface of the ground being traversed and to this end it will be noted, that a thistle mulching and spreading mechanism, designated generally by the numeral 64, is mounted adjacent the discharge end of the conveyor belt 61. This thistle mulching and spreading mechanism includes a housing 65 positioned below the inner end of the supporting frame 21 and rigidly secured thereto by suitable attachment members 66, each extending between the housing and one of the frame members 42 or 43.

The housing 65 has an upwardly facing inlet 66 disposed closely adjacent the discharge end of the conveyor belt 61 and through which the cut thistle fruit falls. The housing is also provided with a discharge or outlet passage 67 which projects laterally inwardly and through which the mulched thistles are impelled.

A mulching member is positioned within the housing 65 and comprises an elongate shaft 68 having a plurality of blades 69 affixed thereto and projecting radially therefrom. It will be noted that the ends of the blades terminate closely adjacent the inner wall surface of the housing 65 and these blades cooperate with the housing to effectively mulch the thistle fruit. It will be noted that the lower end of the shaft 68 is journaled for rotation in a suitable bearing while the upper end of the shaft projects outwardly beyond the housing 65 and above the supporting frame 41.

Means are provided for supplying drive to the reel 55, the sickle bar 58 and the bladed mulching member. This drive means includes an elongate shaft 70 extending transversely of the tractor and having one end connected by suitable gearing to one end of the shaft 28 and having its other end projecting into a gear box 71. One output shaft of the gear box 71 is connected by means of an endless drive belt 72 to a pulley 73 affixed to the upper end of shaft 68 whereby rotary drive is imparted to the shaft 68. Suitable sprocket chain drive mechanism 74 drivingly interconnects the gear box 71 with the shaft 54 of the reel 55 and the small shaft 75 as best seen in FIG. 2. A shaft 75 has a rotary crank 76 affixed thereto for rotation therewith, as best seen in FIG. 4, and this crank cooperatively engages a crank engaging element 77 which is notched and which is connected to the sickle bar 58. Thus rotary drive is supplied to the reel 55 while rectilinear motion is transmitted to the sickle bar 58.

The gear box 71 also has an output shaft drivingly connected to the driven roller 63 by means of a sprocket chain drive 78 whereby the roller 63 is driven in a direction to cause the upper run of the conveyor belt to move in a direction towards the tractor. Thus it will be seen that drive means are provided for the cutter mechanism, the conveyor mechanism and the thistle mulching and spreading mechanism.

When the pea crop is to be cut and windrowed, the tractor T will be driven in a reverse direction whereby the crop cutting device 10 will be positioned forward-most with respect to the direction of travel during the crop cutting operation. Referring now to FIG. 2 it will be seen that the thistle cutting and mulching device 40 will be positioned rearwardly at one side of the crop cutting device 10 and will be moved above the standing pea vines. Thus the thistle cutting and mulching device 40 will cut, convey and mulch the thistles intermingled with the pea vines prior to cutting of a swath of the pea vines. As the crop cutting device 10 moves through the field to cut a swatch of pea vines corresponding substantially to the width of the cutting mechanism, the thistle cutting and mulching device will be moved simultaneously through the pea vines which will constitute the next adjacent swath to be cut. To this end it will be noted that the thistle cutting and mulching device is of a width only slightly larger or approximating the width of the crop cutting device 10.

As the pea vines are cut by the crop cutting device 10, these cut vines will be conveyed laterally by the conveyor belt 25 and will be discharged in windrows to be later picked up by a harvesting combine. These windrows will be spaced apart a distance corresponding substantially to the width of the swath made. However, during the crop cutting operation, the thistle fruit will also be simultaneously cut by the cutting mechanism of the thistle cutting and mulching device and will be conveyed laterally by the apron conveyor 61 into the mulching mechanism 64. The mulching mechanism will crush and mulch the thistle fruit and will discharge the same through the outlet 67 laterally of the direction of travel of the tractor. Referring again to FIG. 2 it will be seen that the outlet passage 67 projects laterally beyond the width of the cutting mechanism of the crop cutting device 10 so that the thistle nuts will be discharged into that portion of the field where the pea vines have been cut. Actually the mulching blades 69 will impel the mulched thistle fruit outwardly through the outlet 67 so that the mulched thistles will be distributed over that surface of the ground constituting the spacing between adjacent windrows. By distributing the mulched thistles between adjacent of the windrows, the thistles do not become intermingled with the pea vines when the latter are picked up by a harvesting combine. Further since the thistles are mulched into relatively small particles, the harvesting combine will pick up very little of these fine particles of mulched thistles. Therefore the problem of separating the thistles from peas in the harvester is minimized and because of the mulched condition of the thistles, effective separation in the harvester is obtained.

From the foregoing it will be seen that I have provided a novel thistle cutting and mulching device which is readily mountable upon a conventional tractor and which is effective in cutting, conveying and mulching the hard nut-like fruit of thistles and other undesirable weeds simultaneously during the crop cutting operation for peas and the like.

It will also be seen that I have provided a novel apparatus for separating thistles from pea vines during a pea vine cutting and windrowing operation and wherein the thistles are first cut, then mulched and thereafter distributed between adjacent pea vine windrows, thereby minimizing any tendency of undesirable materials such as thistles to be picked up by the harvesting combine.

Thus it will be seen that I have provided a novel thistle cutting and mulching apparatus which is not only of simple and inexpensive construction, but one which functions in a more efficient manner than any heretofore known comparable apparatus.

It will of course be understood that various changes may be made in the form, details, arrangement and proportions of the various parts without departing from the scope of my invention.

What is claimed is:

1. Apparatus for cutting and separating thistles and the like from crops, such as pea vines, simultaneously during operation of a crop cutting and windrowing device connected to a tractor and which includes a cutter means mounted closely adjacent the surface of the ground for cutting crops such as pea vines and the like, and conveyor means for receiving and discharging the cut pea vines in windrows, said apparatus comprising a thistle cutting and mulching device including an elongate mounting frame disposed generally horizontally with respect to the surface of the ground, coupling means swingably mounting said frame at one side of the tractor to permit swinging movement of the mounting frame about a vertical axis in a direction rearwardly of the direction of travel from an inoperative position alongside the tractor to an operative position wherein said frame extends laterally outwardly of the tractor, a cutter mechanism mounted on said frame and including an elongate sickle bar mounted longitudinally of said frame for horizontal longitudinal reciprocating movement relative thereto, a horizontaly disposed rotary gathering reel revolvably mounted on said frame for rotation about a horizontal axis, said sickle bar and the under passing arc of rotation of said gathering reel being disposed substantially above the crops to be cut and above the cut level of the cutting means of the crop cutting and windrowing device and at a level whereby said sickle bar and rotary reel cooperate with each other to cut the thistle fruit of mature thistles and the like among the standing crops prior to cutting and windrowing of said crops, an elongated conveyor mechanism mounted longitudinally of said frame and positioned rearwardly of said last mentioned cutter mechanism to receive the cut thistle fruit thereon and to convey the same laterally of the direction of travel and towards the tractor, mulching and spreading mechanism including a substantially closed housing positioned below said conveyor mechanism on said frame adjacent one end thereof, and having an inlet in the top thereof positioned closely adjacent one end of said conveyor mechanism to receive the cut thistle fruit therefrom, said housing having a horizontally disposed discharge passage projecting laterally beyond the confines of the crop cutting and windrowing device, and a revolvable mulching member rotatably mounted in said housing and being operable to mulch the thistle fruit therein and to impel the mulched thistle fruit outwardly through said discharge passage to distribute the same between adjacent of the crop windrows.

2. The apparatus as defined in claim 1 wherein said elongate conveyor mechanism comprises a horizontally oriented endless apron type conveyor with said one end thereof positioned above and in close proximity to the housing inlet.

3. The apparatus as defined in claim 1 wherein said frame coupling means comprises a pair of concentrically arranged vertical posts, one of which is connected to said frame and the other of said posts being connectible to the tractor, said one post being revolvable relative to said other post, and means for releasably locking said posts in the operative position.

4. The apparatus as defined in claim 1 and drive means drivingly interconnected with the power take-off of the tractor and with said revolvable mulching member, rotary reel, and reciprocating sickle bar for driving the same, said drive means including a rotary crank, and a notched crank engaging element on said sickle bar engaging said crank and cooperating therewith to reciprocate said sickle bar.

References Cited by the Examiner

UNITED STATES PATENTS

| | | | |
|---|---|---|---|
| 1,930,855 | 10/33 | MacGregor | 56—20 |
| 2,349,905 | 5/44 | Hyman | 56—119 |
| 2,457,693 | 12/48 | Leicy | 56—25 |
| 2,636,331 | 4/53 | Price | 56—20 X |
| 2,975,578 | 3/61 | Drauden et al. | 56—23 |

T. GRAHAM CRAVER, *Primary Examiner.*

ANTONIO F. GUIDA, *Examiner.*